2,868,780
PREPARATION OF STARCH ESTERS

William H. Minkema, La Grange, Ill., assignor to Corn Products Refining Company, New York, N. Y., a corporation of New Jersey No Drawing. Application April 23, 1957
Serial No. 654,465

7 Claims. (Cl. 260—233.5)

This invention relates to a new and novel process for the preparation of polysaccharide esters of organic acids. More specifically it relates to the preparation of starch esters from starch and ammonium salts of non-volatile, organic acids. Such prior art processes as are available for making starch esters of organic acids by an acidic semidry process, for example, always result in a highly degraded product which has limited uses, if any.

It is an object of the present invention to provide an improved method for the preparation of polysaccharide esters of organic acids. It is a further object to provide an improved method for the preparation of starch esters of organic acids whereby degradation of the starch is minimized. A further object is to prepare mixed esters of polysaccharides. Other objects will appear hereinafter.

I have found that I can prepare polysaccharide esters of organic acids by heating a polysaccharide, such as starch, with ammonium salts or N-substituted ammonium salts of substantially non-volatile organic acids under controlled conditions of moisture and temperature. By this method, I can not only overcome the disadvantages of the prior art, but I can also simplify the process and recovery of the desired end product.

In carrying out my invention, the moisture content of the reaction mixture composed of the starch, for example, and aforementioned salt should be within the range of about 5 to about 20 percent; the temperature should be within the range of about 85 to about 140° C. and means should be provided to remove ammonia or amines and moisture, which are by-products of the reaction.

The reaction mixture may be prepared by making a slurry of starch and the ammonia salt, filtering the slurry, and adjusting the moisture to the desired content under conditions which will not initiate the reaction, or the salt may be dissolved in a suitable solvent, e. g., water, alcohol, N, N-dimethylformamide, etc., and blended with air-dried starch.

The amount of ammonium salt may vary widely depending upon the degree of substitution desired.

A wide variety of ammonium or N-substituted ammonium salts of organic acids may be used provided the organic acid from which the salt is made is substantially non-volatile under the conditions of the reaction aforementioned. For example, ammonium salts of alkyl, aryl, alkene, and substituted alkyl and polybasic non-volatile organic acids may be used.

Reaction conditions must be selected to insure the efficient removal of ammonia and water, which are by-products of the reaction. Therefore, an elevated temperature (in a range of 85° to 140° C.), a partial vacuum or a moderately high rate of air-flow sweeping over the reaction mixture, and the use of dried air (dried by a $H_2SO_4$ bath) are desirable to increase the reaction efficiency. When using higher reaction temperatures, it is necessary to shorten the reaction time in order to avoid dextrinization of the product.

The invention is applicable to a wide variety of polysaccharides such as starches, raw and modified, e. g., as by acid, enzyme, oxidizing agents, and the like, as long as some hydroxyl groups are retained. For ease of recovery of the final product, it is preferable to use starch in ungelatinized form. Cellulose, dextrins, hemicellulose gums and the like may be used also.

The invention will be further illustrated by the following examples which are intended to be typical and informative only and in no way limiting the invention.

EXAMPLE 1

Preparation of an aliphatic fatty acid ester of starch

One-tenth mole of lauric acid was dissolved in 40 ml. of hot methanol and sufficient concentrated $NH_4OH$ added to obtain the ammonium salt. The resulting solution was then blended into 180 grams of starch having a 12 percent moisture content and the mixture air dried to 12 percent moisture (volatiles) and then heated in a vacuum oven for 4 hours at 100° C. A sample of this product was extensively purified by extraction with carbon tetrachloride; the purified product had a laurate D. S. (degree of substitution) of 0.04 (based on percent fatty acid). The final moisture content of the product was 10.45 percent. When pasted the product had a 13 gram Scott viscosity of 71.2 seconds, compared to a 12 gram Scott viscosity of 70.0 seconds of the untreated starch.

EXAMPLE 2

Preparation of aromatic ester of starch

A slurry was prepared consisting of 0.2 mole of ammonium benzoate and 1 mole of corn starch (180 g.) in 190 ml. of water. After thorough mixing, the slurry was filtered and dried to a moisture content of 10 percent. The resulting starch salt mixture (0.1 mole ammonium salt per mole of starch) was pulverized in a Waring Blendor, placed in a vacuum oven and heated for 4 hours at 102° C. After cooling, the product was reslurried and neutralized from pH 4.8 to 7.0 with NaOH. The slurry was filtered and the cake thoroughly washed using methanol and water. The dried product (moisture content 10 percent) had a D. S. of 0.042 (by saponification), and was slightly soluble in benzene.

EXAMPLE 3

Preparation of substituted aliphatic esters of starch

A. PREPARATION OF STARCH CYANOACETATE

A slurry containing 0.2 mole of the ammonium salt of cyanoacetic acid and 1 mole of corn starch was prepared and processed by the same procedure as is described in Example 2. The air-dried mixture was heated in the vacuum oven for 5 hours at 110° C. The product was cooled, reslurried in water, neutralized and filtered. The filter cake was thoroughly washed with water and dried to a moisture content of 8.9 percent. The D. S. (as cyanoacetate based on N) was 0.04. The Scott viscosity on 13 gram basis of a paste of the product was 46.0 seconds.

B. REACTION OF STARCH WITH AMMONIUM CHLOROACETATE

Two-tenths mole of the ammonium salt of chloroacetic acid and 1 mole of starch were slurried, filtered and dried as outlined in Example 2. This reaction mixture was then heated in the vacuum oven 5 hours at 95° C. under reduced pressure. The product was purified by the procedure given in Example 3A. The purified product had a chlorine content of 0.3 percent and a nitrogen content of 0.12 percent. This represents a total product D. S. of 0.028.

C. REACTION OF STARCH WITH TRIMETHYLAMMONIUM CHLOROACETATE

The procedure outlined in Example 3B was followed except for the following changes. An aqueous solution of trimethylamine (25 percent) was used to neutralize the chloroacetic acid in the preparation of the starch-salt reaction mixture. The filtered and air-dried reaction mixture was heated 16 hours at 116° C. in the vacuum oven. The product was cooled, slurried, neutralized and filtered. The cake was washed and dried by the previously indicated procedure to a moisture content of 7.22 percent. The product had a chlorine content of 0.39 percent and a nitrogen content of 0.23 percent which represents a total product D. S. of 0.044. A paste of the product had a 30 gram Scott viscosity of 58.2 seconds.

D. PREPARATION OF THE GLYCINE ESTER OF STARCH

A slurry containing 1 mole of starch in 180 ml. of water and 0.2 mole of ammonium glycinate was prepared, filtered, and the cake air-dried. The ammonium salt-starch mixture was pulverized in a Waring Blendor and heated in the vacuum oven at 122° C. for 3 hours. The product was cooled, slurried in water, neutralized and filtered. The filter cake was purified by washing thoroughly with water and air-dried to a moisture content of 10 percent. The final product had a D. S. (based on percent of nitrogen) of 0.02. A paste of the product had a 13 gram viscosity of 56.0 seconds.

EXAMPLE 4

Preparation of organic acid esters of starch

A. PREPARATION OF STARCH ACID CITRATE

The starch-ammonium citrate blend (0.1 mole ammonium citrate (dibasic) per mole of starch) was prepared by the same procedure outlined in Example 2 and air-dried to a moisture content of 10 percent. This blend was then heated 2 hours at 118° C. with dried air passing over the reaction mixture at a rate of 0.7 cubic foot per minute. The product was cooled and slurried in water and the pH adjusted to 2.2 by adding hydrochloric acid to insure forming the acid form of the derivative. The starch acid citrate was filtered and the filter cake was thoroughly washed with water. The product was then reslurried in water and converted to the sodium salt by adding 0.054 mole of sodium hydroxide. The product was filtered and dried to a moisture content of 3 percent. The product had a D. S. of 0.027 (carboxyl). A paste of the product had an 8 gram Scott viscosity of 50 seconds.

B. REACTION OF STARCH WITH AMMONIUM MALEATE

The procedure described in Example 4A was used in this experiment using 0.1 mole of ammonium maleate (maleic acid adjusted to pH 7.3 with ammonium hydroxide) per mole of starch in the original slurry. The reaction was carried out by heating the blend 6 hours at 110° C. The product was processed the same as is outlined in Example 4A. The D. S. of the product was 0.025 (carboxyl).

C. PREPARATION OF THE ITACONIC ACID ESTER OF STARCH

A blend of the ammonium salt (dibasic) of itaconic acid and starch, prepared by procedure, described in Example 4A, was heated 5 hours at 95° C. in the vacuum oven. This sample was then processed by the procedure described in Example 4A. The final product had a moisture content of 14.12 percent and a D. S. of 0.02 (carboxyl). A paste of the product had a 10 gram Scott viscosity of 80.8 seconds.

D. PREPARATION OF STARCH ACID PHTHALATE

One-tenth mole of orthophthalic acid was converted to the ammonium salt and blended into 1 mole of starch by the procedure outlined in Example 1. This blend was heated for 3½ hours in the vacuum oven at 120° C. with an air sweep (air-flow rate 0.7 cubic foot per minute). The sample was purified by extensive methanol and water washing. The product had a D. S. of 0.022 (carboxyl) and a moisture content of 2.76 percent. A paste of the product had a 10 gram Scott viscosity of 71 seconds.

EXAMPLE 5

Preparation of mixed ester of starch (citrate and cyanoacetate)

Two-tenths mole of ammonium citrate (dibasic) and 0.2 mole of ammonium cyanoacetate were slurried with one mole of corn starch in 180 ml. of water. The slurry was filtered, air-dried to 10 percent moisture and heated for 5 hours at 118° C. in the vacuum oven with an air-sweep (0.7 cubic foot per minute). The sample was purified by the procedure outlined in Example 4A. The product had a D. S. of 0.025 (carboxyl) and cyanoacetate (by percent nitrogen) of 0.041.

I claim:

1. A process for preparing polysaccharide esters of organic acids which comprises heating a mixture of a polysaccharide and a salt of an organic acid having a moisture content within the range of about 5 to about 20 percent of moisture at a temperature within the range of about 85° C. to about 140° C. with concomitant removal of a nitrogen containing compound from the group consisting of ammonia and amine, and moisture; said salt being from the group consisting of ammonium and N-substituted ammonium salts of organic acids non-volatile under the conditions set forth and mixtures thereof.

2. A process according to claim 1 wherein the polysaccharide is starch.

3. A process according to claim 2 wherein the salt is ammonium phthalate.

4. A process according to claim 2 wherein the salt is ammonium citrate.

5. A process according to claim 2 wherein the salt is ammonium laurate.

6. A process according to claim 2 wherein the salt is ammonium chloroacetate.

7. A process according to claim 2 wherein the salt is a mixture of ammonium citrate and ammonium cyanoacetate.

References Cited in the file of this patent

UNITED STATES PATENTS

| Number | Name | Date |
|---|---|---|
| 2,412,213 | Groen | Dec. 10, 1946 |
| 2,459,108 | Lolkema | Jan. 11, 1949 |
| 2,461,139 | Caldwell | Feb. 8, 1949 |

FOREIGN PATENTS

| Number | Country | Date |
|---|---|---|
| 599,066 | Great Britain | Mar. 4, 1948 |

UNITED STATES PATENT OFFICE

CERTIFICATE OF CORRECTION

Patent No. 2,868,780                                          January 13, 1959

William H. Minkema

It is hereby certified that error appears in the above numbered patent requiring correction and that the said Letters Patent should read as corrected below.

In the grant, lines 2 and 3, for "assignor to Corn Products Refining Company, of New York, N. Y., a corporation of New Jersey," read -- assignor to Corn Products Company, a corporation of New Jersey, --; line 12, for "Corn Products Refining Company, its successors" read -- Corn Products Company, its successors --; in the heading to the printed specification, lines 3, 4 and 5, for "assignor to Corn Products Refining Company, New York, N. Y., a corporation of New Jersey" read -- assignor to Corn Products Company, a corporation of New Jersey --.

Signed and sealed this 6th day of October 1959.

(SEAL)
Attest:

KARL H. AXLINE                                                     ROBERT C. WATSON

Attesting Officer                                          Commissioner of Patents